United States Patent [19]

Berger et al.

[11] 3,882,083

[45] May 6, 1975

[54] LATENT ADDITION CURABLE ORGANOPOLYSILOXANE COMPOSITIONS

[75] Inventors: Abe Berger, Schenectady; Bruce Bertolette Hardman, Mechanicville, both of N.Y.

[73] Assignee: General Electric Company, Waterford, N.Y.

[22] Filed: Nov. 21, 1973

[21] Appl. No.: 417,786

[52] U.S. Cl.... 260/46.5 UA; 117/135.1; 117/138.8 R; 117/138.8 E; 117/155 R; 260/37 SB; 260/46.5 G; 260/825
[51] Int. Cl. ............................................ C08f 11/04
[58] Field of Search....... 260/46.5 UA, 46.5 G, 825, 260/37 SB

[56] References Cited
UNITED STATES PATENTS

| | | | |
|---|---|---|---|
| 3,517,001 | 6/1970 | Berger | 260/46.5 G |
| 3,697,473 | 10/1972 | Polmanteer et al. | 260/46.5 UA |

*Primary Examiner*—Melvyn I. Marquis
*Attorney, Agent, or Firm*—Donald J. Voss, Esq.; George B. Finnegan, Jr.; Rocco S. Barrese

[57] ABSTRACT

Addition curable organopolysiloxane compositions which are stable to premature gelation at room temperature for extended periods are provided. Said organopolysiloxane compositions comprise an olefinorganopolysiloxane, an organohydrogenpolysiloxane, a platinum catalyst, and a cure inhibiting amount of an ethylenically unsaturated isocyanurate.

15 Claims, No Drawings

LATENT ADDITION CURABLE ORGANOPOLYSILOXANE COMPOSITIONS

BACKGROUND OF THE INVENTION

This invention relates generally to organopolysiloxane compositions and more particularly to addition curable organopolysiloxane compositions.

Addition curable room temperature vulcanizable (RTV) organopolysiloxane compositions are well known and have found varied applications. Generally, these addition curable RTV formulations must be stored, prior to use, in two separate portions or packages. That is, one package or portion contains the olefinicpolysiloxane and a platinum catalyst, while a second and separate portion contains the organohydrogenpolysiloxane. When the two portions are mixed, curing takes place spontaneously at room temperature. Thus, application of these addition cured RTV formulations must be made almost immediately upon the admixture of all the components since the mixture rapidly gels to a state which cannot be worked. Very often, therefore, these RTV formulations do not have the ability to remain stable and uncured for a sufficient period of time to make their use practical and/or commercially feasible.

Accordingly, in applications where the use of addition cured RTV organopolysiloxane formulations is desirable, it may be preferred to utilize formulations which are inhibited to room temperature cure, that is, latent curable formulations, which remain stable and unchanged at ambient or room temperature for extended periods, but are curable at some future time by the application of heat.

One such stable organopolysiloxane composition is disclosed in U.S. Pat. No. 3,344,111 to Chalk. Chalk discloses a composition stabilized against premature gelation at room temperature which comprises an olefinorganopolysiloxane, a hydrogenorganopolysiloxane, a platinum catalyst, and a cure inhibiting nitrile compound, such as acrylonitrile or a substituted acrylonitrile.

These formulations of Chalk, while generally acceptable, have not been found to be totally satisfactory. For example, improved stability is desirable. Moreover, as a result of the volatile nature of the nitrile cure inhibitors employed by Chalk, such as acrylonitrile, the application of heat during the curing process causes considerable loss of the nitrile compound. Thus, not only is this uneconomical, but it can, without special precautions, result in hazardous toxicological conditions. Moreover, poor surface properties are sometimes seen in the final cured product. These poor surface properties are caused by the flashing out of the volatile nitrile which leaves undesirable craters on the surface of the cured product. In addition, these formulations of Chalk, as a result of the volatile nature of the nitrile cure inhibitors, form a skin of cured rubber on the surface when set out in open containers. This is a very undesirable occurrence.

These disadvantages are entirely overcome with the present compositions.

SUMMARY OF THE INVENTION

Accordingly, it is one object of the present invention to provide a novel addition curable organopolysiloxane composition.

It is another object of this invention to provide a latent addition curable organopolysiloxane composition which is stable to premature gelation at room temperature but which is curable upon the application of heat, i.e., elevated temperatures.

Still another object of the present invention is to provide a latent addition curable organopolysiloxane composition which is characterized by extended shelf life and work life.

A still further object of this invention is to provide a latent addition curable organopolysiloxane composition which is more stable than those provided heretofore and which is not characterized by the hereinbefore described disadvantages.

These and other objects are accomplished herein by providing an organopolysiloxane composition comprising a. an olefinorganopolysiloxane having structural units of the formula:

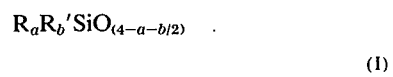

(I)

and b. an organohydrogenpolysiloxane having structural units of the formula:

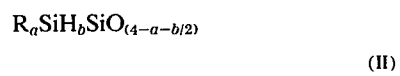

(II)

wherein R is an organic radical attached to silicon by a C—Si linkage and is selected from the group consisting of monovalent hydrocarbon radicals, halogenated monovalent, hydrocarbon radicals, and cyanoalkyl radicals; generally, R contains from 1–30 carbon atoms, straight or branched chained, preferably from 1–12 carbon atoms, and most preferably 1–8 carbon atoms; R' is an olefinic hydrocarbon radical attached to silicon by a C—Si linkage and generally contains from 1–20 aliphatic carbons, straight or branch chained, and preferably 1–12 carbon atoms, linked by multiple bonds (e.g., vinyl, allyl, methallyl, butenyl, pentenyl, ethynyl and the like); $a$ has a value of 0 to 3, inclusive, and preferably from 0.5 to about 2, inclusive, $b$ has a value from 0.005 to 2.0, inclusive, and the sum of $a$ and $b$ is equal to from 0.8 to 3, inclusive, c. a platinum catalyst and d. an ethylenically unsaturated isocyanurate corresponding to the structural formula:

(III)

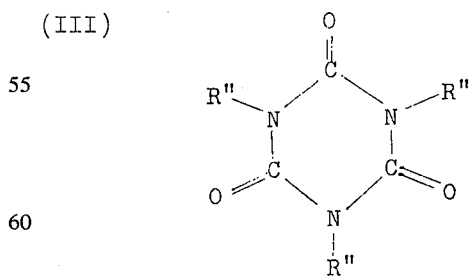

wherein R'' is the same or different and is selected from the group consisting of hydrogen, lower alkyl, aryl, aralkyl, polynuclear aryl, heteroaryl, monofunctional lower-alkenyl and substituted derivatives thereof with the proviso that at least one R'' is monofunctional lower-alkenyl.

DETAILED DESCRIPTION OF THE INVENTION

In particular, the olefinorganopolysiloxanes having structural units represented by Formula I hereinabove are intended to broadly cover fluid organopolysiloxanes which preferably, but not necessarily, are free of silanic hydrogen, and contain olefinic unsaturation by means of double or triple bonds between two adjacent aliphatic carbon atoms. Among the radicals which R represents in Formula I hereinabove are included alkyl, such as methyl, ethyl, propyl, isopropyl, butyl, octyl, dodecyl, and the like; cycloalkyl, such as cyclopentyl, cyclohexyl, cycloheptyl, and the like; aryl, such as phenyl, naphthyl, tolyl, xylyl, and the like; aralkyl, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; cyanoalkyl, such as beta-cyano ethyl, gamma-cyanopropyl, beta-cyanopropyl and the like. Preferably R is methyl. Moreover, formula I is intended to include those materials wherein R is a mixture of the aforesaid radicals.

Among the radicals represented by R' in Formula I hereinabove are included alkenyl, such as vinyl, allyl, methallyl, butenyl, pentenyl, and the like; and alkynyl, such as ethynyl, propynyl, butynyl, pentynyl and the like. Preferably R' is vinyl or allyl and most preferably R' is vinyl.

These olefinorganopolysiloxanes encompassed within the scope of Formula I hereinabove are well known in the art, as particularly manifested by U.S. Pat. No. 3,344,111 to Chalk, and U.S. Patent No. 3,436,366 to Modic, which are incorporated herein by reference. Similarly, their preparation and/or commercial availability is also well known.

Specific materials included within the scope of the olefinorganopolysiloxanes of Formula I hereinabove are low molecular weight materials, such as vinylpentamethyldisiloxane, 1,3-divinyltetramethyldisiloxane, 1,1,3-trivinyltrimethyldisiloxane, 1,1,3,3-tetravinyldimethyldisiloxane, as well as higher polymers containing up to 100,000 or more silicon atoms per molecule. Also included within the scope of the olefinorganopolysiloxanes of Formula I are cyclic materials containing silicon-bonded vinyl or allyl radicals, such as the cyclic trimer, tetramer or pentamer of methylvinylsiloxane

$((CH_2 = CH)(CH_3)SiO)$ or methyl allylsiloxane

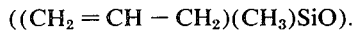

$((CH_2 = CH - CH_2)(CH_3)SiO)$.

Among these cyclic materials, tetramethyltetrallylcyclotetrasiloxane and tetramethyltetravinylcyclotetrasiloxane are preferred.

The olefinorganopolysiloxanes encompassed within the scope of the present invention can be characterized as copolymers of (1) siloxane units having the formula

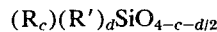

$(R_c)(R')_d SiO_{4-c-d/2}$ (IV)

where R and R' are as defined above and c has a value of from 0 to 2, inclusive, and the sum of c and d is equal to from 1.0 to 3.0, inclusive, and (2) an organopolysiloxane having the structural formula $(R)_n SiO_{4-n/2}$

(V)

where R is as defined above and n has a value of from 0.8 to 2.5, inclusive. Thus, where the olefinorganopolysiloxane employed herein is a copolymer of units within the scope of formula IV with an organopolysiloxane having an average formula within the scope of formula V, the copolymer generally contains from 0.5 to 99.5 mole percent of the units of formula IV, and from 0.5 to 99.5 mole percent of units within the scope of formula V. The preparation of these copolymers is also well known in the art.

A preferred class of organopolysiloxane compositions within the scope of the present invention are those disclosed by Modic in U.S. Pat. No. 3,436,366, incorporated herein by reference. These compositions comprise (1) 100 parts by weight of a liquid vinyl chain-stopped polysiloxane having the formula

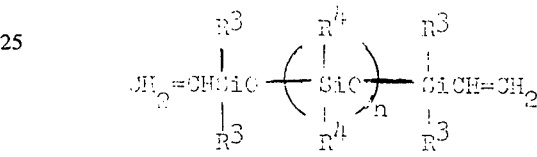

wherein $R^3$ and $R^4$ are monovalent hydrocarbon radicals free of aliphatic unsaturation, with at least 50 mole percent of the $R^4$ groups being methyl, and where n has a value sufficient to provide a viscosity of from about 50,000 to 750,000 centistokes at 25°C, preferably from about 50,000 to 180,000 and (2) from 20 to 50 parts by weight an organopolysiloxane copolymer comprising $(R^5)_3 SiO_{0.5}$ units and $SiO_2$ units, where $R_5$ is a member selected from the class consisting of vinyl radicals and monovalent hydrocarbon radicals free of aliphatic unsaturation, where the ratio of $(R^5)_3 SiO_{0.5}$ units to $SiO_2$ units is from about 0.5:1 to 1:1, and where from about 2.5 to 10 mole percent of the silicon atoms contain silicon-bonded vinyl groups. The vinyl chain-stopped organopolysiloxane component (1) is typified by various compositions where the monovalent hydrocarbon radicals represented by $R^3$ and $R^4$ include alkyl radicals, e.g., methyl, ethyl, propyl, butyl, octyl, etc.; aryl radicals, e.g., phenyl, tolyl, xylyl, etc.; cycloalkyl radicals, e.g., cyclohexyl, cycloheptyl, etc.; aralkyl radicals, e.g., benzyl, phenylethyl, etc. Preferably, all of the radicals represented by $R^3$ and $R^4$ are selected from the group consisting of methyl and phenyl radicals and most preferably $R^3$ and $R^4$ are methyl. In the organopolysiloxane copolymer component (2) $R^5$ can be vinyl and/or monovalent hydrocarbon radicals free of aliphatic unsaturation, with at least the stated proportion of $R^5$ groups being vinyl. The $R^5$ groups which are not vinyl are of the same scope as the $R^3$ and $R^4$ groups and like these, are preferably methyl.

The organohydrogenpolysiloxanes having structural units represented by Formula II hereinabove are intended to broadly cover fluid organopolysiloxanes which are preferably, but not necessarily, free of olefinic unsaturation, but which contain silanic hydrogen. These organohydrogenpolysiloxanes represented by Formula II hereinabove are also well known in the art as particularly manifested by U.S. Pat. No. 3,344,111 to Chalk, and U.S. Pat. No. 3,436,366, incorporated herein by reference.

Among the radicals represented by R in Formula II, hereinabove, similarly to R in Formula I hereinabove, are included alkyl, such as methyl, ethyl, propyl, isopropyl, butyl, octyl and the like; cycloalkyl, such as cyclopentyl, cyclohexyl, cycloheptyl and the like; aryl, such as phenyl, naphthyl, tolyl, xylyl, and the like, aralkyl, such as benzyl, phenylethyl, phenylpropyl, and the like; halogenated derivatives of the above radicals, including chloromethyl, trifluoromethyl, chloropropyl, chlorophenyl, dibromophenyl, tetrachlorophenyl, difluorophenyl and the like; cyanoalkyl, such as beta-cyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove, include 1,3-dimethyldisiloxane, 1,1,3,3-tetramethyldisiloxane, as well as higher polymers containing up to 100,000 or more silicon atoms per molecule. Also included within the scope of Formula II hereinabove are cyclic materials, such as cyclic polymers of methyl hydrogen siloxane having the formula $$(CH_3SiHO)_x$$

wherein $x$ is a whole number equal to from 3 to 10 or more. Particularly included is tetramethylcyclotetrasiloxane.

The organohydrogenpolysiloxanes employed in the practice of the present invention can also be characterized as copolymers containing at least one unit per molecule having the formula:

$$(R_c)(H)_dSiO_{4-c-d/2}$$

(VI)

with the remaining siloxane units in the organopolysiloxane being within the scope of Formula V hereinabove, where R, $c$, $d$ and $n$ are defined above.

Within the scope of Formula VI are siloxane units, such as hydrogen siloxane units $(H_2SiO)_{1.5}$, methyl hydrogen siloxane units $(HSiCH_3O)$, dimethyl hydrogen siloxane units, and dihydrogen siloxane units $(H_2SiO)$. In these copolymers, the siloxane units of Formulae V and VI are present in proportions so as to form a hydrogenpolysiloxane within the scope of Formula II hereinabove. In general, these copolymers contain from 0.5 to 99.5 mole percent of the siloxane units of Formula V with from 0.5 to 99.5 mole percent of the siloxane units of Formula VI.

The platinum catalyst component employed in the compositions of the present invention includes all of the well known platinum catalysts which are effective for catalyzing the reaction between silicon-bonded hydrogen groups and silicon-bonded olefinic groups. These materials include, for example, finely divided elemental platinum catalysts, such as those described in U.S. Pat. No. 2,970,150 to Bailey, the chloroplatinic acid catalysts described in U.S. Pat. No. 2,823,218 to Speier, the platinum hydrocarbon complexes shown in U.S. Pat. No. 3,159,601 to Ashby and U.S. Pat. No. 3,159,662 to Ashby, as well as the platinum alcoholate catalysts described in U.S. Pat. No. 3,220,972 to Lamoreaux. Moreover, the platinum chloride-olefin complexes described in U.S. Pat. No. 3,516,946 to Modic are also useful herein. All of the aforesaid U.S. Patents are intended to be incorporated herein by reference.

The ethylenically unsaturated isocyanurates of Formula III hereinabove provide the organopolysiloxane compositions of the present invention with desirable latent curing properties. Thus, as a result of their presence, the organopolysiloxane compositions of the present invention are inhibited to premature gelation, i.e., room temperature curing, and therefore can be stored for extended periods of time, for example about 2 months, and subsequently cured with the application of heat without loss of desired hardness or surface properties to the final cured product.

Referring to Formula III hereinabove, which represents the ethylenically unsaturated isocyanurate cure inhibitors within the scope of the present invention, R'' may be the same or different and is selected from the group consisting of hydrogen, alkyl, aryl, aralkyl, polynuclear aryl, heteroaryl, monofunctional lower-alkenyl, and non-interfering substituted derivatives thereof, with the proviso that at least one R'' is monofunctional lower-alkenyl. Alkyl and substituted alkyl are intended to include one to about 20 carbon atoms, straight or branch chained, and include, for example, methyl, ethyl, chloroethyl, cyanopropyl, propyl, isopropyl, butyl, dibromobutyl, isobutyl, pentyl, hexyl, dodecyl and the like. By aryl, aralkyl, polynuclear aryl, heteroaryl and non-interfering substituted derivatives thereof is intended to include phenyl, chlorophenyl, dibromophenyl, naphthyl, benzyl, pyridyl, cyanophenyl, tolyl, xylyl, phenanthyl and the like. By non-interfering substituted derivatives is meant those functionalities that do not render the platinum catalysts completely ineffective. Monofunctional lower-alkenyl is intended to include two to about six carbon atoms, straight or branch chained, containing one carbon to carbon double bond, and includes, for example, vinyl, allyl, butenyl, isobutenyl, pentenyl, hexenyl, and the like. Preferably, at leeast one R'' is allyl and most preferably all three R'' groups are allyl.

Specific materials within the scope of Formula III are, for example, triallylisocyanurate, diallylisocyanurate, diallylethylisocyanurate, tributenylisocyanurate and diallylphenylisocyanurate. Triallylisocyanurate and diallylisocyanurate are preferred. Triallylisocyanurate is the most preferred.

The ethylenically unsaturated isocyanaurates represented by Formula III hereinabove are either commercially available or are conveniently prepared. Included among the procedures for their preparation known in the art is the reaction of the appropriate organic halide or mixture of the appropriate organic halides with potassium isocyanate in any dipolar, aprotic solvent medium, such as N, N-dimethyl formamide (DMF), dimethylsulfoxide (DMSO), hexamethylphosphorus triamide (HMPA) and the like. Illustrated pictorially and using allyl chloride, for example, as the appropriate organic halide this reaction is represented in the following manner:

$$3\ CH_2\!=\!CHCH_2Cl + 3\ KNCO \xrightarrow{solvent} (CH_2\!=\!CHCH_2NCO)_3.$$

The temperature for this reaction can range from ambient to about 150°C. Similarly, trimethallylisocyanurate, tributenylisocyanurate, triisobutenylisocyanurate, diallylethylisocyanurate, allyldiethylisocyanurate, diallylbenzylisocyanurate and the like are prepared by using the appropriate alkenyl halide or mixture of alkenyl halide and alkyl halide and/or aralkyl halide in the above reaction scheme.

Another manner known in the art to prepare the ethylenically unsaturated isocyanurates of the present invention involves the cyclization of the appropriate organic isocyanate with a basic catalyst such as, for example, a phosphene, an alkali metal alkoxide or a tin salt. Using alkylisocyanate, for example, as the organic isocyanate, this reaction is shown as follows:

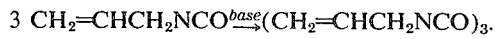

This method is most preferred to prepare the aryl substituted isocyanurates of this invention.

Furthermore, it is also evident to those skilled in the art that the ethylenically unsaturated isocyanurates of Formula III hereinabove may be prepared by the selective replacement of the active hydrogen atoms of isocyanuric acid by the appropriate alkyl halide and/or alkenyl halide.

Diallylisocyanurate and triallylisocyanurate are commercially available from the Allied Chemical Company.

The ethylenically unsaturated isocyanurates of the present invention are electron rich molecules which are reactive in an addition cure mechanism. Thus, during the cure of the organopolysiloxane compositions of this invention, it is theorized that these isocyanurates are incorporated into the polymer and can increase the crosslink density through their ethylenically unsaturated functionality. Furthermore, as a result of their diminished volatility in comparison to such prior art cure inhibitors like acrylonitrile discussed hereinbefore, the disadvantages associated with these acrylonitrile type inhibitors are not found in the present compositions.

The proportions of the various ingredients employed in the compositions of the present invention can vary within wide limits. These proportions of the ingredients are affected by the stoichiometry of the addition reactants involved since many of the final products prepared from the compositions of the invention exhibit satisfactory properties for intended purposes even when the final product contains unreacted silicon-bonded olefinic radicals or unreacted silicon-hydrogen linkages. For economic and commercial purposes it is generally preferred that the olefinorganopolysiloxane and the organohydrogenpolysiloxane be present in such proportions that the composition contains from about 0.005 to 20 silicon-hydrogen linkages per silicon-bonded olefin radical. However, it is often most desirable to have an equal number of silicon-hydrogen linkages and olefin groups in the composition so as to produce a final product which is substantially free of either silicon-hydrogen linkages or silicon-bonded olefin radicals.

Regardless of the type of platinum catalyst employed, it is generally present in an amount related to the amount of the olefin radicals in the olefinorganopolysiloxane and in an amount sufficient to cause the co-reaction of the olefinorganopolysiloxane and the organohydrogenpolysiloxane. Thus, satisfactory results may be obtained when the platinum catalyst is present in amounts sufficient to provide as little as one atom of platinum per million silicon-bonded olefin radicals in the olefinorganopolysiloxane. On the other hand, amounts of the platinum catalyst sufficient to provide as high as one to 10 platinum atoms per 1,000 silicon-bonded olefin radicals may also be used. In general, however, it is preferred to employ the platinum catalyst in an amount sufficient to provide one platinum atom per one thousand to one million silicon-bonded olefin radicals in the olefinorganopolysiloxane ingredient.

The amount of the ethylenically unsaturated isocyanurate employed in the practice of the present invention also varies within wide limits depending upon various conditions. These conditions are, for example, the amount of platinum catalyst used, the particular type of platinum catalyst used, the particular olefinorganopolysiloxane and organohydrogenpolysiloxane employed, and also the degree of cure inhibition desired. Generally, however, the ethylenically unsaturated isocyanurate of this invention is present in an amount sufficient to inhibit premature gelation, i.e., cure at room temperature, but insufficient to prevent cure at elevated temperature. More particularly, the ethylenically unsaturated isocyanurate compound of this invention may be present in an amount in the range of from about 0.01 to about 5 weight percent of the total composition, and preferably from about 0.5 to about 2 weight percent of the total composition. Considered another way, the isocyanurate of this invention may be present in an amount between 1 and 100,000 parts by weight of ethylenically unsaturated isocyanurate for each part by weight of platinum present. About 500 to 50,000 parts by weight of ethylenically unsaturated isocyanurate for each part by weight of platinum present is most preferred.

The latent addition curable organopolysiloxane compositions of the present invention can be prepared by mixing, in any suitable fashion, all of the components described hereinabove, plus any additional components such as will be described hereinafter. As a result of the latent curing ability of the present compositions, these premixed compositions can be stored as such and kept at ambient room temperature for extended periods of time until ready to be used. Thus, they provide extended work life without concern for premature gelling.

Of course, while the compositions of the present invention can be prepared by premixing all the various components in any desired fashion, it may be found more convenient to prepare these compositions in two separate portions or packages which are later combined at the time the compositions are to be cured, i.e., converted to the solid elastic state. Therefore, in the case of a two-package formulation, it is convenient to include in the first package the olefinorganopolysiloxane, the platinum catalyst and the ethylenically unsaturated isocyanurate. If other materials, generally used with compositions similar to those of the present invention are desired, such as fillers, like quartz, silica, titanium dioxide, carbon black, glass fibers, etc., coloring agents, pigments, and the like, they, too, are conveniently placed in the first package. The second package generally contains as its ingredient the organohydrogenpolysiloxane component. However, as a matter of convenience the second package may also contain all or part of the ethylenically unsaturated isocyanurate and also a portion of the olefinorganopolysiloxane, and a portion of, for example, the filler material if desired.

When the two package system is employed, the two portions are merely mixed in suitable fashion at the point of use and the mixture is cured with the application of heat.

In general, the compositions of the present invention are cured at elevated temperatures in the range of from about 70°C to 150°C. Complete cure time generally ranges from about one-half hour to about 5 hours. Of course, these and other details concerning the curing of the compositions of this invention depend upon their particular composition and application and are within the knowledge of those skilled in the art.

In addition to the latent curing ability properties of the compositions of this invention, it has also been surprisingly discovered that the present compositions are sometimes characterized with self-bonding, adhesive properties.

Thus, the compositions of the present invention are particularly useful in areas where good release behavior is desired, such as in molding applications. Moreover, the compositions of the present invention are useful as potting compositions, particularly for electronic components. Furthermore, the present compositions, depending upon the particular substrate, can also be useful where primerless adhesion is desired. Specifically, the compositions of the present invention have found particular application in the coating of electronic component substrates, such as wire. In addition, the compositions of the present invention are generally useful for those applications in which organosilicon compositions of this nature have become well known.

The following examples are presented in order to provide those skilled in the art a better understanding of how the present invention is practiced. It will be understood that these examples are given by way of illustration and not by way of limitation.

EXAMPLE 1

This example illustrates the preparation of an organopolysiloxane composition, stabilized against premature gelation at room temperature, according to the present invention.

Part A 100 parts by weight of a 100,000 centistoke dimethylvinyl chain-stopped dimethylpolysiloxane fluid, 30 parts of a copolymer of trimethylsiloxane units, $SiO_2$ units and methylvinylsiloxane units, the various units being present in an amount to provide 0.8 trimethylsiloxane units per $SiO_2$ unit and with the methylvinylsiloxane units being present in an amount such that 7.0 mole percent of the silicon atoms are present as methylvinylsiloxane units and the remainder as a portion of a trimethylsiloxane unit or a $SiO_2$ unit, 65 parts of a finely divided quartz having a particle size averaging about 5 microns, 3 parts of a cobalt-based pigment to impart a blue color to the composition, 2.2 parts by weight of triallylisocyanurate, and a sufficient amount of the platinum alcoholate catalyst described in Example 1 of U.S. Pat. No. 3,220,972 to Lamoreaux to provide $2 \times 10^{-5}$ parts platinum per part of silicon-bonded vinyl groups in the total composition.

Part B 100 parts by weight of the 100,000 centistoke dimethylvinyl chain-stopped dimethylpolysiloxane fluid of Part A, 7 parts by weight of a 10 centistoke liquid copolymer of dimethylhydrogensiloxane units and $SiO_2$ units containing an average of two of the dimethylhydrogensiloxane units per $SiO_2$ unit and 65 parts of the finely divided quartz of Part A.

10 parts by weight of Part A are mixed with one part by weight of Part B.

No cure takes place after about 6 months at ambient room temperature. Thereafter, baking at 100°C for about 1 hour permits a proper cure.

EXAMPLE 2

This example illustrates the preparation of an organopolysiloxane composition, stabilized against premature gelation at room temperature, according to the present invention.

Part A 100 parts by weight of a 350 cps vinyldimethyl stopped polydimethylsiloxane fluid, 90 parts by weight of a ground silica filler (average size of 10 microns), 1 part by weight of carbon black, sufficient amount of the platinum alcoholate catalyst described in Example 1 of U.S. Pat. No. 3,220,972, to Lamoreaux to provide 5.3 parts per million of platinum, and 1 part by weight of triallylisocyanurate.

Part B 96 parts by weight of a 350 cps. vinyldimethyl stopped polydimethylsiloxane fluid, 90 parts by weight of a ground silica filler (average particle size of 10 microns) and 4 parts by weight of a dimethylhydrogen stopped methyl hydrogen dimethyl polysiloxane fluid containing 0.77 percent hydrogen.

After 100 parts by weight of Part A are mixed with 100 parts by weight of Part B a composition having a viscosity of 780 cps. results. After 28 days at ambient conditions the viscosity is 920 cps. When the composition is heated to 125°C for 30 minutes, the mixture cures to a solid plug having a shore A hardness of 53.

EXAMPLE 3

An organopolysiloxane composition similar to Example 2 is prepared except that the platinum catalyst is employed in amount to provide 10 parts platinum per million of the total composition. No cure takes place at ambient temperature for 54 days.

EXAMPLE 4

0.5 percent by weight of triallylisocyanurate of the total composition is employed in the composition of Example 2. No cure takes place at ambient room temperature for 35 days. Baking at 100°C for about 1 hour results in a cured product having excellent hardness and surface properties.

EXAMPLE 5

0.1 percent by weight of triallylisocyanurate of the total composition is employed in the composition of Example 2. No cure takes place at ambient room temperature for 10 days. Thereafter, baking at 100°C for about 1 hour results in a cured product having excellent hardness and surface properties.

EXAMPLE 6

0.05 percent by weight of triallylisocyanurate of the total composition is employed in the composition of Example 2. No cure takes place for 6 days at ambient room temperature. Baking thereafter, at 100°C for about 1 hour results in a cured product having excellent hardness and surface properties.

EXAMPLE 7

Compositions similar to that of Example 2 but employing the following levels of triallylisocyanurate and platinum (based on elemental platinum) are prepared and exposed to ambient room temperature.

| Level of triallylisocyanurate % weight | Level of platinum ppm | Time to cure days |
|---|---|---|
| 1.0 | 10 | >38 |
| 0.5 | 10 | 34 |
| 0.1 | 10 | 10 |
| 0.05 | 10 | 6 |
| 1.0 | 20 | >30 |
| 0.5 | 20 | >30 |
| 0.25 | 20 | 15 |
| 0.1 | 20 | 7 |

EXAMPLE 8

A mechanical mixture is prepared of 2 parts by weight of 0.4% ethanol solution of chloroplatinic acid, 1 part by weight triallylisocyanurate and 50 parts by weight each of tetravinyltetrmethylcyclotetrasiloxane and tetramethylcycloytetrasiloxane $(CH_3SiHO)_4$. No cure takes place at ambient room temperature. The mixture of ingredients is baked at 100°C for about 1 hour and results in a cured product having excellent properties.

EXAMPLE 9

Compositions similar to that of Examples 2 and 7 are prepared by replacing the triallylisocyanurate with diallylisocyanurate or diallylethylisocyanurate or dipropylallylisocyanurate. Similar cure results are obtained.

EXAMPLE 10

The self-bonding, adhesive properties of the uncured composition of Example 1, degassed under vacuum, are examined qualitatively. In all experiments cure is obtained by baking at 100°C for more than 4 hours. Bond quality values are based on the following scale: 1-release, 2-some adhesive strength, 3-partial cohesive failure, 4-complete cohesive failure.

Qualitative Adhesion Tests

| Substrate | Bond Quality |
|---|---|
| Aluminum (clad) | 4 |
| Stainless Steel | 1 |
| Brass | 4 |
| Polycarbonate | 4 |
| Polyacrylate | 1 |
| Polyolefin | 1 |
| Polyvinyl chloride | 4 |
| Cardboard | 4 |

Without the incorporation of the triallylisocyanurate in the composition of Example 1, the cured composition does not adhere to any of the above surfaces.

Obviously, other modifications and variations of the present invention are possible in the light of the above teachings. It is, therefore, to be understood that changes may be made in the particular embodiments of the invention described which are within the full intended scope of the invention as defined by the appended claims.

What is claimed and desired to be received by Letters Patent of the United States is:

1. A latent curable composition stabilized against premature gelation comprising:
   a. an olefinorganopolysiloxane having units of the structural formula

$$R_aR'_bSiO_{4-a-b/2}$$

b. an organohydrogenpolysiloxane having units of the structural formula

$$R_aSiH_bSiO_{4-a-b/2}$$

wherein R is selected from the group consisting of a monovalent hydrocarbon radical, a halogenated monovalent hydrocarbon radical, a cyanoalkyl radical and mixtures thereof, R' is an olefinic hydrocarbon radical, wherein $a$ has a value of from 0 to 3, inclusive, $b$ has a value of from 0.005 to 2.0, inclusive, and the sum of $a$ and $b$ is equal to from 0.8 to 3, inclusive,
   c. a sufficient amount of a platinum catalyst to cause the co-reaction of (a) and (b) and
   d. an ethylenically unsaturated isocyanurate corresponding to the structural formula

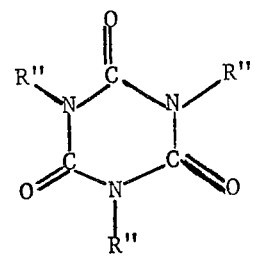

wherein R'' is the same or different and is selected from the group consisting of hydrogen, alkyl, aryl, aralkyl, polynuclear aryl, heteroaryl, monofunctional lower-alkenyl and non-interfering substituted derivatives thereof with the proviso that at least one R'' is lower-alkenyl, said ethylenically unsaturated isocyanurate being present in an amount sufficient to inhibit premature gelation but insufficient to prevent cure at elevated temperature.

2. The composition of claim 1 wherein R is selected from the group consisting of alkyl, cycloalkyl, aryl, aralkyl, haloalkyl, halogenated cycloalkyl, haloaryl, halogenated aralkyl, cyanoalkyl, and mixtures thereof, R' is selected from the group consisting of alkenyl and alkynyl, and R'' is selected from the group consisting of hydrogen, lower-alkenyl and mixtures thereof with the proviso that at least one R'' is lower-alkenyl.

3. The composition of claim 2 wherein R is alkyl and R' is alkenyl.

4. The composition of claim 3 wherein R is methyl, R' is vinyl and the ethylenically unsaturated isocyanurate is selected from the group consisting of diallylisocyanurate and triallylisocyanurate.

5. The composition of claim 4 wherein the olefinorganopolysiloxane is tetramethyltetravinylcyclotetrasiloxane and the organohydrogenpolysiloxane is tetramethylcyclotetrasiloxane.

6. The composition of claim 4 wherein the ethylenically unsaturated isocyanurate is triallylisocyanurate.

7. The composition of claim 5 which includes an inorganic filler.

8. The composition of claim 4 wherein the olefinorganopolysiloxane is a vinyldimethyl stopped-polydimethylsiloxane fluid having a viscosity of about 350 centipoise and the organohydrogenpolysiloxane is a dimethylhydrogen stopped methylhydrogenpolysiloxane fluid having about 0.77 percent hydrogen.

9. The composition of claim 8 which includes an inorganic filler.

10. The composition of claim 1 wherein the olefinorganopolysiloxane is comprised of (1) a liquid vinyl chain-stopped polysiloxane having the formula

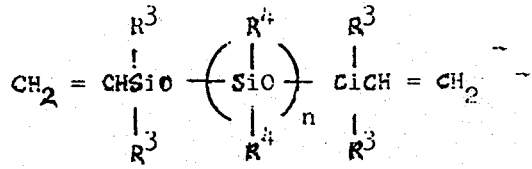

where $R^3$ and $R^4$ are monovalent hydrocarbon radicals free of aliphatic unsaturation with at least 50 mole percent of the $R^4$ groups being methyl and where n has a value sufficient to provide a fluid material having a viscosity of from about 50,000 to 750,000 centistokes at 25°C, and (2) an organopolysiloxane copolymer comprising trimethylsiloxane units, methylvinylsiloxane units and $SiO_2$ units where from about 2.5 to 10 mole percent of the silicon atoms contain silicon-bonded vinyl groups and where the ratio of trimethylsiloxane units to the $SiO_2$ units is between 0.5 : 1 and 1 : 1.

11. The composition of claim 10 wherein $R^3$ and $R^4$ are methyl.

12. The composition of claim 10 wherein said ethylenically unsaturated isocyanurate is selected from the group consisting of triallylisocyanurate and diallylisocyanurate.

13. The composition of claim 11 wherein the ethylenically unsaturated isocyanurate is selected from the group consisting of diallylisocyanurate and triallylisocyanurate.

14. The composition of claim 13 wherein said ethylenically unsaturated isocyanurate is triallylisocyanurate.

15. The composition of claim 14 which includes an inorganic filler.

* * * * *

UNITED STATES PATENT AND TRADEMARK OFFICE
CERTIFICATE OF CORRECTION

PATENT NO. : 3,882,083
DATED : May 6, 1975
INVENTOR(S) : Abe Berger et al

It is certified that error appears in the above-identified patent and that said Letters Patent are hereby corrected as shown below:

Column 2, line 22, subscript "(4-a-b/2)" in the formula should read $-\left(\frac{4-a-b}{2}\right)-$;

line 28, subscript "(4-a-b/2)" in the formula should read $-\left(\frac{4-a-b}{2}\right)-$.

Column 3, line 63, subscript "4-c-d/2" in the formula should read $-- \frac{4-c-d}{2} --$.

Column 4, line 4, subscript "4-n/2" in the formula should read $-- \frac{4-n}{2} --$.

Column 5, line 37, subscript "4-c-d/2" in the formula should read $-- \frac{4-c-d}{2} --$.

Column 12, line 5, subscript "4-a-b/2" in the formula should read $-- \frac{4-a-b}{2} --$;

line 9, subscript "4-a-b/2" in the formula should read $-- \frac{4-a-b}{2} --$

Signed and Sealed this nineteenth Day of August 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,882,083
DATED : May 6, 1975
INVENTOR(S) : Abe Berger et al

It is certified that error appears in the above-identified patent and that said Letters Patent are hereby corrected as shown below:

Column 2, line 27, formula "$R_a SiH_b SiO_{(4-a-b/2)}$" should read --$R_a H_b SiO_{(4-a-b)/2}$--

Column 12, line 10, formula "$R_a SiH_b SiO_{4-a-b/2}$" should read --$R_a H_b SiO_{(4-a-b)/2}$--

Signed and Sealed this seventh Day of October 1975

[SEAL]

Attest:

RUTH C. MASON
*Attesting Officer*

C. MARSHALL DANN
*Commissioner of Patents and Trademarks*